United States Patent [19]
Akimoto et al.

[11] Patent Number: 5,336,287
[45] Date of Patent: Aug. 9, 1994

[54] METHOD FOR BONDING GLASS AND METAL

[75] Inventors: Toshio Akimoto; Kazuo Shibaoka, both of Osaka, Japan

[73] Assignee: Nippon Sheet Glass Co., Ltd., Osaka, Japan

[21] Appl. No.: 77,371

[22] Filed: Jun. 17, 1993

[30] Foreign Application Priority Data

Jun. 19, 1992 [JP] Japan ................... 4-161008

[51] Int. Cl.$^5$ ............ C03C 27/04; H01J 9/236
[52] U.S. Cl. ........................ 65/59.5; 501/32; 445/30
[58] Field of Search ............. 65/59.5; 501/32; 313/480, 407; 445/30, 37

[56] References Cited

U.S. PATENT DOCUMENTS

| | | | |
|---|---|---|---|
| 4,923,422 | 5/1990 | Capek et al. | 445/30 |
| 4,934,975 | 6/1990 | Fritsch et al. | 65/59.5 X |
| 4,952,188 | 8/1990 | Greiner et al. | 445/30 |
| 5,270,268 | 12/1993 | Jean et al. | 501/32 |

*Primary Examiner*—Jeff H. Aftergut
*Attorney, Agent, or Firm*—Sughrue, Mion, Zinn, Macpeak & Seas

[57] ABSTRACT

A method of bonding a glass and a metal with a low-melting glass frit, in which the low-melting glass frit contains from 1 to 10% by weight of an aluminum borate whisker, and the difference in linear expansion coefficient between the low-melting glass frit and the glass is $10 \times 10^{-7}/°C$. or less; and a method for producing a cathode ray tube comprising the step of bonding a glass back plate and a metal stud pin with a low-melting glass frit, the low-melting glass frit containing from 1 to 10% by weight of an aluminum borate whisker, and the difference in linear expansion coefficient between the low-melting glass frit and the glass back plate being $10 \times 10^{-7}/°C$. or less.

4 Claims, 1 Drawing Sheet

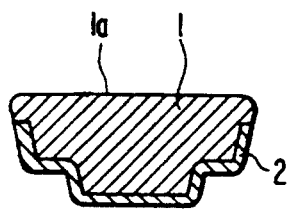
FIG. 1(a)
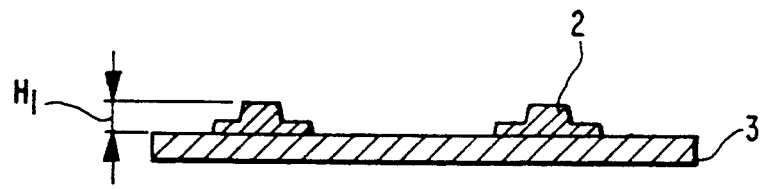
FIG. 1(b)
FIG. 2
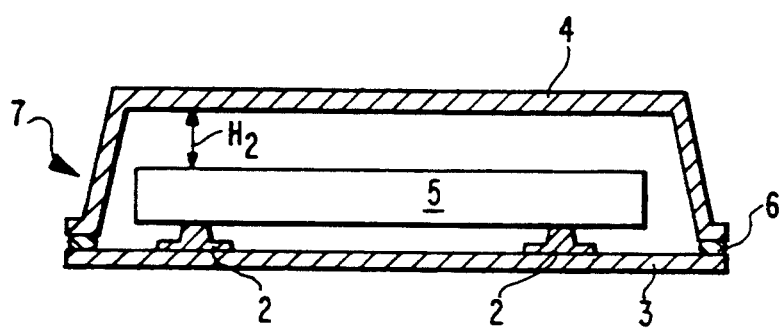

METHOD FOR BONDING GLASS AND METAL

FIELD OF THE INVENTION

The present invention relates to a method for bonding a glass and a metal with a low-melting glass frit, and more particularly to a method of bonding, e.g., metal stud pins to a glass plate without causing a large displacement of the distance between the pedestal surfaces of the metal stud pins from the surface of the glass plate even by re-heating. The present invention also relates to a method for producing a cathode ray tube.

BACKGROUND OF THE INVENTION

To the glass back plate of a thin-type cathode ray tube (CRT) are bonded and fixed metal stud pins, and parts such as an electron gun, etc., are supported and fixed in the inside of the CRT by the stud pins. When the thickness of the back plate is at least about 10 mm, the stud pins are embedded in the glass and welded thereto. When the thickness of the glass back plate is thin, e.g., thinner than 7 mm, the stud pins are bonded to the back plate with a low-melting glass frit. In the latter case, there has been proposed a method of using a low-melting glass frit containing a silicon carbide whisker for improving the shock resistance of the bonded portions.

However, there is a phenomenon that when a bonded article, where a glass and a metal (e.g., stud pins) are bonded with a low-melting glass frit containing a silicon carbide whisker, is subjected to re-heating, e.g., a heating process at a temperature of 400° C. or higher, the distance between the surface of the glass and the pedestal portion of the stud pin changes, because of the volume expansion of the low-melting glass frit caused by the release of adsorbed water in the silicon carbide whisker.

In the manufacture of a thin-type CRT, this phenomenon becomes a serious problem to precisely control the distance ($H_2$ in FIG. 2) between an electron gun unit and the image-displaying surface at the inside surface of a glass face plate on which a fluorescent substance is coated.

SUMMARY OF THE INVENTION

An object of the present invention is to provide a method for bonding a metal, e.g., a metal stud pin, to a glass, e.g., a glass plate, without causing a large displacement of the distance between the pedestal surfaces of the metal stud pins from the surface of the glass plate even by re-heating.

Another object of the present invention is to provide a method for producing a cathode ray tube without causing a large displacement of the distance between the pedestal surfaces of a metal stud pin supporting an electronic part thereon inside the tube from the surface of a glass back plate even by re-heating.

Other objects and effects of the present invention will be apparent from the following description.

The present invention relates to a method of bonding a glass and a metal with a low-melting glass frit, the low-melting glass frit containing from 1 to 10% by weight of an aluminum borate whisker, and the difference in linear expansion coefficient between the low-melting glass frit and the glass being $10 \times 10^{-7}$/°C. or less.

The present invention also relates to a method for producing a cathode ray tube comprising the step of bonding a glass back plate and a metal stud pin with a low-melting glass frit, the low-melting glass frit containing from 1 to 10% by weight of an aluminum borate whisker, and the difference in linear expansion coefficient between the low-melting glass frit and the glass back plate being $10 \times 10^{-7}$/°C. or less.

BRIEF DESCRIPTION OF THE DRAWINGS

FIGS. 1(*a*) and 1(*b*) are a cross-sectional view explaining one embodiment of the method of bonding a glass and a metal according to the present invention and FIG. 2 is a schematic cross-sectional view of a CRT manufactured by using one embodiment of the method of the present invention.

DETAILED DESCRIPTION OF THE INVENTION

If the content of the aluminum borate whisker in the low-melting glass frit for use in the present invention is less than 1% by weight, the effect of the addition of the whisker is not obtained and the shock resistance of the bonded article is not increased. If the content of the whisker is larger than 10% by weight, the bonding strength is lowered. In the present invention, therefore the content of the aluminum borate whisker in the low-melting glass frit is from 1 to 10% by weight, and preferably from 2 to 7% by weight. The content of the aluminum borate whisker herein is based on the total amount of the low-melting glass frit and the aluminum borate whisker.

The aluminum borate whisker preferably has a fiber length of from 5 to 100 μm, more preferably from 10 to 30 μm, and a fiber diameter of from 0.5 to 1 μm.

The difference in linear expansion coefficient between the low-melting glass frit containing aluminum borate whisker and the glass is $10 \times 10^{-7}$/°C. or less, and preferably $5 \times 10^{-7}$/°C. or less. The linear expansion coefficient used herein means those in the temperature range of from 30° to 350° C.

The compositions of the glass to be bonded to a metal and the low-melting glass frit are not particularly limited as long as the difference in linear expansion coefficient between them is $10 \times 10^{-7}$/°C. or less. Examples thereof include a mixture of "IWF-7590" and "IWF-7575W" (trade names, both made by Iwaki Glass K.K.) (mixing ratio: 85/15) which has the following composition:

| | |
|---|---|
| $SiO_2$ | 2.7 wt % |
| $Al_2O_3$ | 1.2 wt % |
| PbO | 73 wt % |
| $B_2O_3$ | 8.4 wt % |
| ZnO | 11.8 wt % |
| $ZrO_2$ | 1.0 wt % |
| BaO | 1.6 wt % |
| $Fe_2O_3$ | 0.3 wt % |

The metal to be bonded to the glass is not particularly limited. Preferred examples of the metal to be bonded to the glass include 42Ni-6Cr-52Fe, 47Ni-6Cr-47-Fe, and 50Ni-50Fe.

In the present invention, a glass and a metal may be bonded in such a manner that an intermediate low-melting glass frit is inserted between the glass and the low-melting glass frit containing aluminum borate whisker. Such an intermediate low-melting glass frit has an intermediate linear expansion coefficient between the glass and the low-melting glass frit containing aluminum borate whisker and does not contain aluminum borate whisker.

Furthermore, a glass and a metal may be bonded in such a manner that another intermediate low-melting glass frit is inserted between the metal and the low-melting glass frit containing aluminum borate whisker. Such an intermediate low-melting glass frit has an intermediate linear expansion coefficient between the metal and the low-melting glass frit containing aluminum borate whisker and does not contain aluminum borate whisker.

The compositions of the above-mentioned intermediate low-melting glass frits are not particularly limited as long as they have the above-specified linear expansion coefficients. Examples thereof include those having the same composition as the low melting glass frit but not containing aluminum borate whisker.

The method of the present invention is described in detail below by referring to one embodiment but is not construed as being limited thereto.

The preparation method of the low-melting glass frit containing aluminum borate whisker used in the present invention is not particularly limited. For example, a low-melting glass frit and an aluminum borate whisker are mixed, and an organic vehicle is added to the resulting mixture to prepare a paste of the low-melting glass frit containing aluminum borate whisker.

The paste can be shaped into any form and poured into a portion having arbitrary shape, such as a concaved portion of a stud pin as a metal to be bonded to a glass, and then calcined to remove the organic vehicle. The calcining conditions are not particularly limited and, for example, by increasing the temperature at 5° C./min to 380° C., maintaining at 380° C. for 1 hour, and then decreasing at 5° C./min to room temperature. The organic vehicle is not particularly limited and can be appropriately selected depending on the shape of the portion to which the paste is applied, and the like. The calcining conditions can be appropriately selected depending on the organic vehicle.

The thus-calcined low-melting glass frit containing aluminum borate whisker in the concave portion of the stud pin is then press-stuck to a glass to be bonded, such as a glass back plate of a CRT, and then baked to achieve the bonding of the metal and the glass. The baking conditions are not particularly limited as long as the bonding is achieved and, for example, by increasing the temperature at 5° C./min to 450° C., maintaining at 380° C. for 1 hour, and then decreasing at 5° C./min to room temperature.

The low-melting glass frit being used in the present invention is controlled such that the difference of the linear expansion coefficient between the low-melting glass frit and the glass to be bonded to a metal is small, and contains a proper amount of an aluminum borate whisker not causing a water releasing reaction even when it is heated to a high temperature, so as to attain a high shock resistance of bonding of the glass-metal bonded article obtained by the bonding method of the present invention. Furthermore, since in the bonded article obtained by the bonding method of the present invention, the glass frit does not cause a thermal expansion by the release of adsorbed water, the relative displacement of the position of the metal to the glass bonded to the metal can be restrained in a less extent even when the bonded article is heated to a high temperature.

FIG. 2 is a schematic cross-sectional view showing a CRT produced by the method of the present invention and in the CRT 7, a glass face plate 4 is closely stuck to a glass back plate 3 with a glass frit 6 and in the inside at a reduced pressure, an electronic part unit 5, e.g., an electron gun unit, is supported and fixed by stud pins 2 which are bonded to the glass back plate 3 with a low-melting glass frit containing aluminum borate whisker according to the present invention.

The method for producing a CRT according to one embodiment of the present invention comprises (1) a step of producing a glass face plate from a glass plate by molding, (2) a step of fixing an electron gun unit on a glass back plate through a metal stud pin by bonding the stud pin and the glass back plate with the low-melting glass frit according to the present invention, (3) a step of bonding the glass face plate and the glass back plate to form a glass vessel, and (4) a step of evacuating the inside of the glass vessel followed by being sealed to produce a CRT.

In the method for producing a CRT according to the present invention, the other production steps than the bonding of the stud pins and glass back plate, e.g., the production method of a glass face plate, the bonding method of the glass parts (such as a glass face plate and a glass back plate), the fixing method of the electronic part (such as an electron gun unit) to the stud pins, the evacuation method, etc., are not particularly limited and may be conducted according to the conventional processes of the production of a CRT. For example, the production method of a glass face plate is disclosed in JP-A-1-122931, and the structure of the CRT is disclosed in JP-A-1-194250.

Then, the present invention is explained in more detail by referring to the following example and comparative examples, but is not construed as being limited to the example.

EXAMPLE 1

FIG. 1 is a cross-sectional view explaining the method of bonding a glass and a metal stud pin by the method of the present invention.

A low-melting glass frit having a linear expansion coefficient of $88 \times 10^{-7}$/°C. ("IWF-7575W", trade name, made by Iwaki Glass K.K.) and a low-melting glass frit having a linear expansion coefficient of $99 \times 10^{-7}$/°C. ("IWF-7590", trade name, made by Iwaki Glass K.K.) were mixed with each other at a ratio of 2/8 by weight, and the mixed low-melting glass frit was further mixed with an aluminum borate whisker ("Alborex G", trade name, made by Shikoku Kasei K.K.) such that the whisker was contained in an amount of 4% by weight. The resulting mixture was further mixed with 10% by weight isoamyl acetate to form a paste.

The paste 1 obtained was poured into a concaved portion of a stud pin 2 made of a 18Cr-Fe alloy having a concaved cross-sectional form and a linear expansion coefficient of $110 \times 10^{-7}$/°C. After calcining the stud pin for 10 minutes at 395° C., the exposed surface 1a of the low-melting glass frit was polished, and the thickness of the portion of the glass frit protruded from the edge of the stud pin 2 was adjusted to provide the stud pin having fixed thereto the low-melting glass frit as shown in FIG. 1(a).

The stud pin was press-stuck to a back plate 3 composed of a soda-lime-silica glass having a linear expansion coefficient at 460° C. of $94 \times 10^{-7}$/°C., and the assembly was baked at 460° C. for one hour to bond the stud pin 2 to the back plate such that the distance $H^1$ from the surface of the back plate 3 to the pedestal surface of the stud pin 2 became a definite length, as shown in FIG. 1(b).

When a shearing force was applied to the stud pin 2 bonded onto the back plate, as shown in FIG. 1(b), at a displacement speed of 3 mm/second, the stud pin was not damaged until the shearing force reached about 90 kgf. When a shock of about 50 G was applied to the stud pin at a load of about 2 kg, the stud pin was not damaged. Furthermore, when the bonded article of the stud pins and the back plate was subjected to a heat-treatment test at 460° C. for one hour, the displacement of the distance $H_1$ from the surface of the back plate to the pedestal surface of each stud pin caused by the expansion of the low-melting glass frit was less than 15 μm when the thickness of the low-melting glass frit was 5 mm.

The shock resistance of the bonded article obtained and the displacement amount of the distance $H_1$ caused by heating are shown in Table 1 below.

COMPARATIVE EXAMPLE 1

By following the same procedure as in Example 1 except that a low-melting glass frit having a linear expansion coefficient of $88 \times 10^{-7}$ ("IWF-7575W", trade name, made by Iwaki Glass K.K.) added with 4% by weight silicon carbide whisker was used as the low-melting glass frit, a glass-metal bonded article was prepared, and the shock resistance of the bonded portion and the displacement amount of the distance $H_1$ caused by heating were measured in the same manner as in Example 1. The results are shown in Table 1 below.

COMPARATIVE EXAMPLE 2

By following the same procedure as in Example 1 except that a low-melting glass frit having a linear expansion coefficient of $88 \times 10^{-7}$ ("IWF-7575W", trade name, made by Iwaki Glass K.K.) added with no whisker was used as the low-melting glass frit, a glass-metal bonded article was prepared, and the shock resistance of the bonded portion and the displacement amount of the distance $H_1$ caused by heating were measured in the same manner as in Example 1. The results are shown in Table 1 below.

TABLE 1

| | LEC* of low-melting glass frit (a) (/°C.) | LEC* of glass (b) (/°C.) | LEC* of stud pin (/°C.) | a−b** (/°C.) | Kind and content of whisker in low-melting glass frit | Displacement amount of distance $H_1$ from glass surface to pedestal surface of stud pin (μm) | Shock resistance (G) |
|---|---|---|---|---|---|---|---|
| Example 1 | $94 \times 10^{-7}$ | $94 \times 10^{-7}$ | $110 \times 10^{-7}$ | 0 | Aluminum borate whisker 4 wt % | <+15 | 50 |
| Comparative Example 1 | $89 \times 10^{-7}$ | $94 \times 10^{-7}$ | $110 \times 10^{-7}$ | $5 \times 10^{-7}$ | Silicon carbide whisker 4 wt % | +300 | 40 |
| Comparative Example 2 | $89 \times 10^{-7}$ | $94 \times 10^{-7}$ | $110 \times 10^{-7}$ | $5 \times 10^{-7}$ | none | +10 | <25 |

Note
*LEC: linear expansion coefficient
**a−b: difference between LEC of low-melting glass frit and LEC of glass As described above, according to the method of the present invention, a glass-metal bonded article having a high sock resistance and causing less displacement of the relative position of a glass and a metal part even by re-heating.

When the method of the present invention is applied to a glass face plate for a CRT, an electron part unit can be supported and fixed in the CRT without causing displacement of the position thereof to the image-displaying surface.

While the invention has been described in detail and with reference to specific examples thereof, it will be apparent to one skilled in the art that various changes and modifications can be made therein without departing from the spirit and scope thereof.

What is claimed is:

1. A method for bonding a glass and a metal with a low-melting glass frit, said low-melting glass frit containing a content from 1 to 10% by weight of an aluminum borate whisker, and a difference in linear expansion coefficient between said low-melting glass frit and said glass being $10 \times 10^{-7}$/°C. or less.

2. A method for bonding a glass and a metal with a low-melting glass frit as claimed in claim 1, wherein the content of said aluminum borate whisker in said low-melting glass frit is from 2 to 7% by weight.

3. A method for producing a cathode ray tube comprising the step of bonding a glass back plate and a metal stud pin with a low-melting glass frit, said low-melting glass frit containing a content from 1 to 10% by weight of an aluminum borate whisker, and a difference in linear expansion coefficient between said low-melting glass frit and said glass back plate being $10 \times 10^{-7}$/°C. or less.

4. A method for producing a cathode ray tube as claimed in claim 3, wherein the content of said aluminum borate whisker in said low-melting glass frit is from 2 to 7% by weight.

* * * * *